United States Patent Office 3,492,342
Patented Jan. 27, 1970

3,492,342
SULFONATION OF NITRO COMPOUNDS
Gerald F. Hazen, Clarence, and Ralph L. Drisko, West Seneca, N.Y., assignors to Allied Chemical Corporation, New York, N.Y., a corporation of New York
No Drawing. Filed Nov. 21, 1966, Ser. No. 595,600
Int. Cl. C07c 143/38, 143/40
U.S. Cl. 260—505
5 Claims

ABSTRACT OF THE DISCLOSURE

An improvement in the process of sulfonating nitroaromatic compounds whereby sulfone formation is minimized is provided by adding sulfur trioxide at a temperature below 40° C. and thereafter heating to a temperature of at least 130° C.

---

This invention relates to improvements in the process of sulfonating nitro compounds. More particularly, it relates to an improved process for the direct sulfonation of nitro aromatic compounds with sulfur trioxide in which the formation of sulfones is minimized.

Aromatic compounds such as benzene, toluene, naphthalene and their mononitrated derivatives have been sulfonated by reacting these compounds with sulfuric acid and with oleum of various strengths. In all of such processes, water is formed during the reaction, which retards and even prevents the reaction from going to completion, thus resulting in a waste of aromatic compound and of sulfonating agent. Of equal commercial importance, such sulfonation reactions when conducted on a large scale require additional processing steps and consume relatively large quantities of additional chemicals to remove and safely dispose of residual sulfuric acid.

Direct sulfonation of such compounds has been accomplished with sulfur trioxide, which theoretically obviates such difficulties attendant upon the use of sulfuric acid, since no water is liberated in the reaction. However, the by-product formation of sulfones which is known to occur to a varying extent in all sulfonation reactions, is intensified when the compound being sulfonated is present in excess and when an active reagent such as sulfur trioxide is used. The quantities of sulfones formed in the reaction in the liquid phase may be as high as 30% in some cases, and it is obvious that such extensive by-product formation is undesirable since it represents loss of starting material and sulfonating agent.

Moreover, the sulfone-forming reaction occurs with the production of water, which leads to the formation of sulfuric acid. These side reactions are illustrated by the following equations:

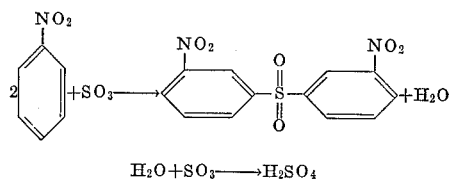

$$H_2O + SO_3 \longrightarrow H_2SO_4$$

Various methods have been suggested for reducing objectionable sulfone formation in the direct reaction of aromatic compounds with sulfur trioxide. For example, it has been suggested to carry out the reaction in the presence of solvents, such as chloroform, or liquid sulfur dioxide, or by using sulfur trioxide complexes with compounds such as dioxane or by carrying out the sulfonation in the presence of sulfone-formation inhibitors, such as saturated lower aliphatic acids, nitric acid or an oxygen-containing acid of phosphorus. Such procedures have produced aromatic sulfonic acids with lower sulfone content but the cost of recovery of solvent or the removal of the complexing agent or inhibitor render the process commercially unattractive.

It is therefore, a principal object of this invention to provide a process for the direct sulfonation of nitro aromatic compounds with sulfur trioxide in which the formation of sulfones is minimized.

Another object is to provide a process for the direct sulfonation of mononitro aromatic compounds with gaseous sulfur trioxide in which the formation of sulfones is minimized.

Another object of the invention is to provide a method for producing nitro aromatic sulfonic acids, substantially uncontaminated by sulfones.

These and other objects are accomplished according to our invention, wherein mononuclear and dinuclear nitro aromatic compounds having at least one replaceable hydrogen atom in a meta position of the nucleus with respect to the nitro group, are treated in two successive stages by first adding sulfur trioxide to the nitro aromatic compound at a temperature not exceeding about 40° C. whereby a sulfur trioxide-nitro aromatic compound adduct is formed, thereafter heating the adduct to at least about 130° C. to rearrange the adduct and complete the sulfonation of the nitro aromatic compound.

The nitro aromatic compounds which can be efficiently sulfonated by our improved process include unsubstituted and substituted mono and dinuclear nitro aromatic compounds which have at least one replaceable hydrogen atom in a meta position of the nucleus with respect to the nitro group and include lower alkyl and halogen substituted compounds, preferably mononitro aromatic compounds unsubstituted or substituted with methyl or chlorine groups such as for example nitrobenzene, o-nitrotoluene, p-nitro toluene, p-chloronitrobenzene nitro xylenes, 1-nitronaphthalene, 2-nitronaphthalene and the like.

The process of our invention may conveniently be carried out by adding the sulfur trioxide in gaseous form to the nitro aromatic compound which is in liquid form, i.e., either in solution in a non-reactive solvent such as chloroform, or in the case of nitro compounds which are liquid at temperatures below 40° C., preferably between about 20° and about 40° C., to the pure compound. The nitro compound is cooled to below about 40° C. and maintained thereat by external cooling during the major portion, at least, of the addition of the sulfur trioxide. The latter is added to the liquid mass, at a point below the surface thereof, preferably through a gas diffusion device or other conventional means to insure adequate contact between the gaseous and liquid phases.

Upon bringing the reactants together, reaction is generally initiated immediately and is exothermic so that it is desirable to provide suitable means for removing heat from the reaction so as to prevent the temperature from rising substantially above 40° C., at least until the major portion, i.e., 60% or more of the sulfur trioxide has been introduced and reacted.

The reaction between the nitro compound and the sulfur trioxide takes place in two stages. It is believed that initially an addition compound of sulfur trioxide and nitro aromatic is formed and subsequently the addition compound or complex is caused to rearrange to the desired sulfonic acid by the agency of heat. In most instances this addition compound is of limited solubility in the reaction mixture and after about half of the sulfur trioxide has been added and has reacted, the complex precipitates out causing the reaction mass to thicken and preventing adequate mixing of the unreacted portion of the mass. In such instances, it is preferable to permit the reaction mixture to warm up so as to hold the addition compound, for the most part at least, in solution and thereby to permit agitation and the completion of the desired initial reaction. Inasmuch as the solubility of the various addition compounds of nitro aromatic compounds with sulfur trioxide varies greatly, it is not possible to specify at which point the temperature control means should be relaxed. However, it will be in all cases at some point, if at all, after the major portion of the complex compound has formed, i.e., more than 50% of the initial reaction, and it will be within the skill of the trained operator by observing the fluidity of the reaction mass, to recognize the appropriate time to permit the temperature to rise above about 40° C.

After the desired quantity of gaseous sulfur trioxide has been added, at least about one mol equivalent and preferably about a 2 to 10% by weight excess, the reaction mass is heated rapidly to a temperature of at least 130° C. to rearrange the addition compound. Although this rearrangement commences and proceeds slightly at temperatures of about 100° C., the mass must be heated to at least about 130° C. for the rate to become conveniently rapid and to obtain maximum yields as will be discussed further below. We have discovered that a reaction mass usually requires only about two hours at 130° C. to complete the rearrangement with maximum yield of product, at 125° C. requires about eight hours with decreasing yield and at 120° C. requires in excess of twenty-four hours with a substantial decrease in the yield of product. Due to the well-known sensitivity of nitro compounds to heat, the maximum temperature suggested for the rearrangement step will vary according to the sensitivity of the particular compound.

Following completion of the rearrangement step, the reaction mass may be cooled slightly, e.g., to about 100° C. or below, and drowned in water. The drowned aqueous mass may be neutralized with an alkaline material, filtered to remove any insoluble sludge, including sulfones, and the clarified filtrate evaporated to isolate in solid form the alkaline salt of the nitro aromatic sulfonic acid. Other methods for the isolation of the sulfonic acid products of our improved process will be obvious to those skilled in this art.

By the process of our invention, the amount of sulfone formed is substantially less than that amount formed by omitting the step of adding the sulfur trioxide at 40° C. or below, or by failure to heat to temperatures of at least 130° C. during the rearrangement reaction. The product resulting from our improved process is substantially entirely the corresponding nitro aromatic monosulfonate (if the proportion of sulfur trioxide is approximately one mol equivalent per mol equivalent of nitro aromatic compounds) uncontaminated by more than about one percent of sulfone, the product usually containing somewhat less than one percent by weight of sulfone.

The following specific examples will illustrate the improved process of our invention. Parts and percentages are by weight and temperatures are given in degrees centigrade.

EXAMPLE 1

1,340 parts of dry nitrobenzene were charged to a jacketed cast iron sulfonation kettle equipped with impeller-type agitator and heating and cooling means. The nitrobenzene was added and then cooled to between 10° and 30° with continuous agitation. Sulfur trioxide vapors, derived by heating stabilized sulfur trioxide to 90° to 100°, were passed into the cooled agitated nitrobenzene through a gas diffusing leg at a point beneath the surface of the liquid mass. The mass was cooled with brine and the rate of addition of the gaseous sulfur trioxide was adjusted so that the temperature of the mass was maintained at 30° to 35°. After about two hours, about 900 parts (about 4% excess) of sulfur trioxide had been added. The reaction mixture then was heated rapidly to 132° and maintained thereat for about two hours. The mixture was cooled to about 100° to 110° and drowned in about 6,250 parts of cold water. The resulting drowned mass was cooled to about 75° to 80°, and neutralized with aqueous sodium hydroxide to a pH of 9.5–10.0. The resulting solution of m-nitrobenzene sodium sulfonate had a strength of about 40% by volume, contained less than 1% of sulfones and was practically free from unreacted nitrobenzene.

About 0.003 part of activated carbon were added to each 100 parts of the aqueous mass and then, after about 10 minutes of agitation the mixture was clarified by filtration. The filtrate was treated with about 0.0002 part (per 100 parts) of sodium hypochlorite to improve the color of the mass. Ethylenediaminetetracetic acid, tetrasodium salt was added in an amount corresponding to about 2% based on the weight of m-nitrobenzene sodium sulfate dissolved in the mass and the solution was drum-dried. The product, m-nitrobenzene sodium sulfonate, was obtained in about 98% of the theoretical yield.

EXAMPLES 2–6

A series of sulfonations were conducted in the manner described in Example 1 above but varying the temperature of addition of sulfur trioxide and/or "rearrangement" temperature. The results with respect to amount of sulfones produced and conversion as indicated by the amount of unchanged nitrobenzene present in the drowned mass are indicated in the following table.

TABLE 1

| Exp. | Temp. of $SO_3$ addition (deg.) | Temp. and time of rearrangement | Percent sulfones | Percent unchanged nitrobenzene |
|---|---|---|---|---|
| 2 | 35–40 | 120°, 2 hrs | (*) | 6.2 |
| 3 | 35–40 | 130°, 2 hrs | 0.4 | 0.1 |
| 4 | 50–55 | 130°, 2 hrs | 4.0 | <0.1 |
| 5 | 55–60 | 130°, 2 hrs | 7.6 | 0.7 |
| 6 | 55–60 | 130°, 2 hrs | 9.3 | 0.1 |

* Not determined.

These data indicate that the temperature at which the sulfur trioxide is added to the nitro aromatic compound affects the amount of sulfones produced, and that about 40° is a critical point above which 4% or more sulfones are formed. Further, these data show that the temperature at which the "rearrangement" of the sulfur trioxide adduct is preformed affects the yield of nitro aromatic sulfonate. In this instance about 130° is apparently a critical temperature, since in those experiments in which the rearrangement was carried out at 130° the amount of unchanged nitrobenzene was 0.1% or less while at temperatures below 130°, the amount of unchanged nitrobenzene is 6.2% or higher.

The stabilized sulfur trioxide employed as the source of the gaseous sulfur trioxide in the above examples, was a commercially available product known in the trade as "Sulfan B," "Sulfan" being a registered trademark. Other sources of gaseous sulfur trioxide can be used, as will be obvious to those skilled in this art.

The sulfone content of the sulfonation mass reported in the above examples was determined by extracting a measured portion of the neutralized aqueous solution with ether or chloroform, evaporating the extract to dryness and weighing the residue.

The nitrobenzene content of the sulfonation mass was determined by extracting a measured portion of the neutralized aqueous solution with cyclohexane and estimating the content of nitrobenzene in the sample from the infra-red absorbance of the extract at 14.26 microns.

It can thus be seen that an efficient and economical procedure for the sulfonation of nitro aromatic compounds has been devised and that this procedure is characterized not only by high yields but also almost complete suppression of the formation of sulfones.

While the above purely illustrative examples include the preferred embodiments of the invention, it will be understood departures may be made therefrom within the scope of the specification and claims.

We claim:
1. In a process for sulfonating nitro-aromatic compounds with sulfur trioxide in which sulfone formation is minimized, said nitro-aromatic compound being selected from the group consisting of unsubstituted and substituted mono- and di-nuclear aromatic compounds having at least one replaceable hydrogen atom meta to the nitro group, wherein the substituent is selected from the group consisting of lower alkyl and halogen, the improvement which comprises (1) adding at least one mol equivalent of gaseous sulfur trioxide to said nitro aromatic compound at a temperature below 40° C. and (2) thereafter heating the reaction mixture to a temperature of at least 130° C. to complete the sulfonation reaction.

2. The process according to claim 1 wherein the sulfur trioxide is added to the nitro aromatic compound at temperatures between about 20° C. and about 40° C.

3. A process according to claim 1 wherein said sulfur trioxide is added in amounts equivalent to a 2 to 10% by weight excess of the stoichiometric equivalent.

4. The process according to claim 1 wherein said nitro-aromatic compound is selected from the group consisting of nitrobenzene, o-nitrotoluene, p-nitrotoluene, p-chloronitrobenzene, nitroxylene, and nitronaphthalene.

5. In a process for sulfonating nitrobenzene with sulfur trioxide in which sulfone formation is minimized, the improvement which comprises (1) adding at least one mole equivalent of gaseous sulfur trioxide to nitrobenzene, at a temperature below 40° C. and (2) thereafter heating the reaction mixture to a temperature of at least 130° C. to complete the sulfonation reaction.

References Cited
UNITED STATES PATENTS

| | | | |
|---|---|---|---|
| 1,835,394 | 12/1931 | Hentrich et al. | 260—505 |
| 2,378,168 | 6/1945 | Witte | 260—505 |
| 2,795,621 | 6/1957 | Bloom et al. | 260—505 |
| 2,835,708 | 5/1958 | Kamlet | 260—505 |

FOREIGN PATENTS 1,421,947  11/1965  France.

LEON ZITVER, Primary Examiner

J. E. EVANS, Assistant Examiner

U.S. Cl. X.R.

260—607, 645, 646